UNITED STATES PATENT OFFICE.

WILLIAM AUGUSTUS HALL, OF BELLOWS FALLS, VERMONT.

PROCESS OF PRODUCING CASEIN.

SPECIFICATION forming part of Letters Patent No. 632,408, dated September 5, 1899.

Application filed April 1, 1899. Serial No. 711,403. (No specimens.)

*To all whom it may concern:*

Be it known that I, WILLIAM AUGUSTUS HALL, a citizen of the United States, residing at Bellows Falls, in the county of Windham and State of Vermont, have invented certain new and useful Improvements in Processes of Producing Casein, of which the following is a specification.

In the production of casein for use as an adhesive agent in paper-sizings and waterproofing enamels it is customary to use an acid to precipitate the curd. The acids commonly in use, such as sulfuric or acetic acid, combine with the precipitate or casein and can only be removed therefrom by repeated washings and drainings of the curd, the presence of the acid in the casein being objectionable in certain compositions of which the casein is an ingredient. The process of freeing the casein of its precipitating acid by washing and draining is tedious and imperfect, and it is impracticable in the production of the casein for the market to so thoroughly wash the curd as to entirely clear it of the acid as to be sure that none is left to interfere with the use of the casein for any purpose for which it may be desired. I have conceived the idea, therefore, of overcoming the difficulties heretofore encountered in the production of pure casein and enumerated above by the use of an acid which is readily volatilized. It will be apparent that an acid which is easily transformed into its gaseous form may be eliminated from the casein compound by drying with or without the application of a moderate heat. It is essential that an acid be used which will volatilize at so low a temperature as to preclude all danger of injuring the casein by excessive heat. In fact, it is preferable that an acid be used which will be expelled in gaseous form during the process of drying the casein after its precipitation.

I find that muriatic acid (HCl) is well adapted for the carrying out of the method which I have discovered, since this acid, (HCl,) which is really a gas and in its ordinary commercial form consists of water in which the gas is absorbed, passes off by evaporation, being highly volatile.

I preferably take the casein after it has been precipitated, with the acid (HCl) combined with it, and submit it to a temperature of about 120° Fahrenheit and preferably in the presence of a considerable draft. The heat or dry air volatilizes the muriatic acid remaining in the casein and the acid-gas is driven off, leaving the dried casein free from acid.

Having thus described my invention, I claim and desire to secure by Letters Patent—

1. The herein-described process of producing casein from milk, consisting in precipitating the curd by means of muriatic acid, and then subjecting the casein thus formed to a temperature sufficient to volatilize and drive off the acid remaining therein.

2. The herein-described process of producing casein from milk, consisting in precipitating the curd by means of muriatic acid, and then subjecting the casein thus formed to a temperature sufficient to volatilize the acid in the presence of a current of air.

In testimony whereof I affix my signature in the presence of two witnesses.

WILLIAM AUGUSTUS HALL.

Witnesses:
　HENRY CALVER,
　H. O. CUSHMAN.